United States Patent [19]

Moyers et al.

[11] 4,453,417
[45] Jun. 12, 1984

[54] UNITIZED MEASUREMENT INSTRUMENT CONNECTOR APPARATUS

[75] Inventors: Michael E. Moyers, Rosharon; Edsel O. Ross, Stafford, both of Tex.

[73] Assignee: Anderson, Greenwood & Company, Bellaire, Tex.

[21] Appl. No.: 355,857

[22] Filed: Mar. 8, 1982

[51] Int. Cl.³ .............................................. G01F 1/36
[52] U.S. Cl. ............................ 73/861.42; 73/272 R; 73/756
[58] Field of Search .............. 73/756, 272 R, 861.42, 73/861.52, 861.58; 137/883, 561 A

[56] References Cited

U.S. PATENT DOCUMENTS

| | | | |
|---|---|---|---|
| 3,566,696 | 3/1971 | Maddison et al. | 73/756 |
| 4,192,342 | 3/1980 | Adams | 73/756 X |
| 4,319,492 | 3/1982 | Hewson et al. | 73/756 |

FOREIGN PATENT DOCUMENTS 990102  6/1976  Canada ................................. 73/756

Primary Examiner—Herbert Goldstein
Assistant Examiner—Brian Tumm
Attorney, Agent, or Firm—Gunn, Lee & Jackson

[57] ABSTRACT

For use in connecting a measuring instrument across a pipeline portion having an orifice therein to create a pressure drop whereby static and differential pressure signals are formed, a unitized connector apparatus is set forth in the preferred and illustrated embodiment and includes an elongate rectangular body having a lengthwise axial passage drilled therethrough. Additional passages intersect the long passage at the ends, and suitable valve means are included near the ends thereof. The structure is a unitized structure adaptable for quick and prompt installation with a minimum of connections made to the measuring instrument. Moreover, the structure is roddable, that is, the passages can be easily cleaned by means of a rod inserted therethrough.

2 Claims, 4 Drawing Figures

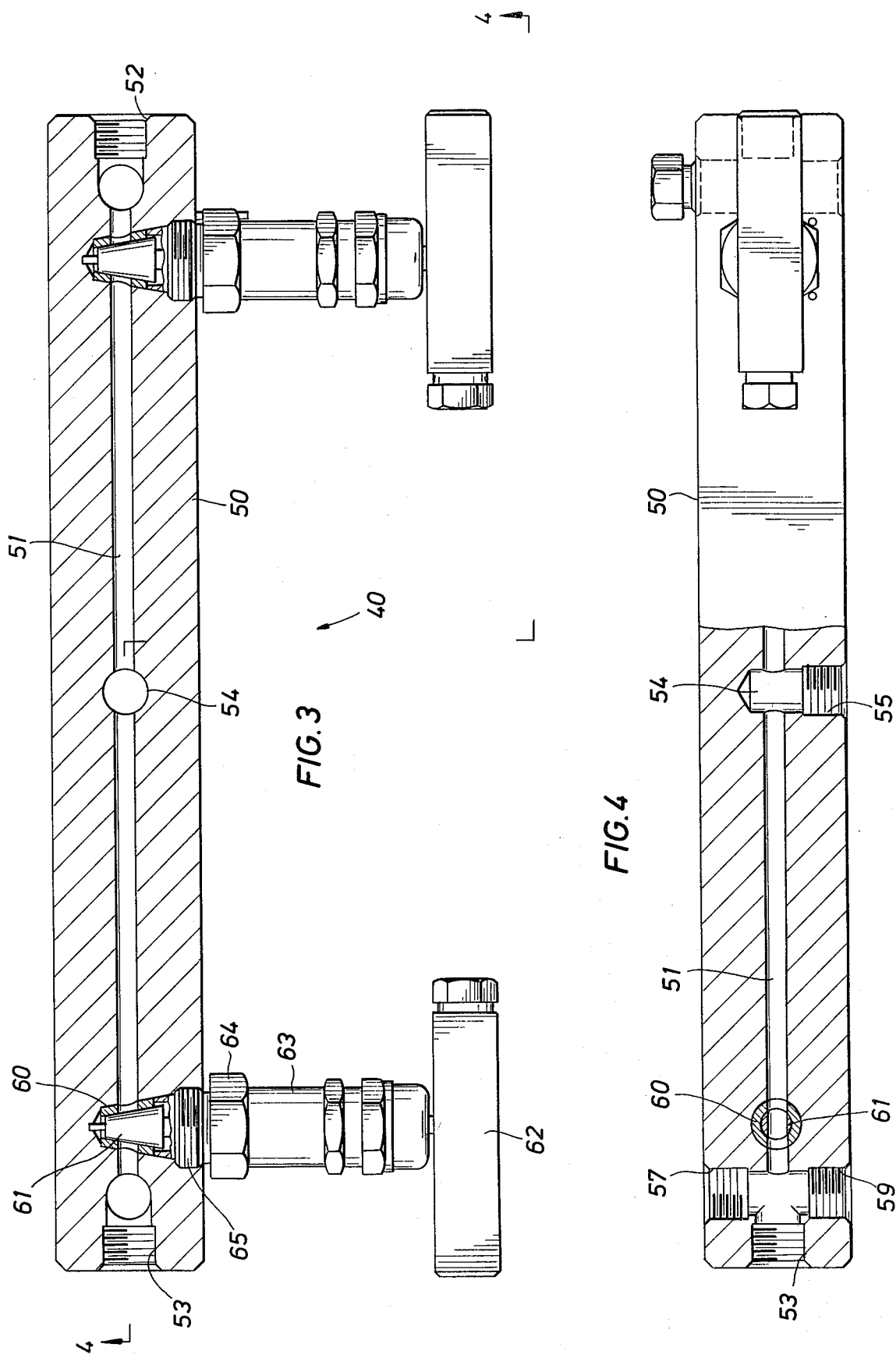

UNITIZED MEASUREMENT INSTRUMENT CONNECTOR APPARATUS

BACKGROUND OF THE DISCLOSURE

This disclosure relates to a connector apparatus to be interposed between measurement instrumentation and a flowing pipeline. In a pipeline flowing a product which is normally sold at a specified price per standard unit volume, it is necessary to measure the flow. One technique of measuring the flow through the pipeline involves the use of an orifice located in the pipeline. A differential pressure across the orifice is measured, and through the use of various techniques, the volume flow through the pipeline can be calculated. This technique requires that pressure be taken from each side of the orifice, and the two pressure signals are then used to obtain an incremental or differential pressure. In addition, it is often necessary to obtain either the upstream or downstream pressure which is being used as the static pressure.

Before a description of the present apparatus begins, it is helpful to set the stage by describing methods of connection of apparatus used heretofore. To this end, FIG. 1 has been included in the drawings to set forth the prior art. Briefly, FIG. 1 discloses a pipeline, including an orifice plate, and upstream and downstream connectors extending through suitable small fluid conduits to the suitable instrumentation. One instrument is incorporated which is responsive to the instantaneous differential pressure. As required, static pressure can also be obtained.

It is important to note, in FIG. 1, the method of connection that prevailed heretofore. In particular, the number of fittings and connections required to assemble the apparatus of FIG. 1 should be noted. On observing FIG. 1, it will be noted that there are thirty or more connections which have to be made. A connection is defined as a threaded joint which is made up between male and female threads. FIG. 1 shows a crossover having four legs, and hence this crossover requires four connections. It also shows tees at two locations, and each tee requires three connections with the three legs. Elbows are included and they all require two connections. All the valves and measuring instruments require at least one, and most require two connections. It is easy to see that the hand labor to install the prior art arrangement set forth in FIG. 1 is extensive. FIG. 1 is a worst case display of connections. The actual installations in the field may vary from the quantity of FIG. 1; while a typical installation may not be quite as complex, the nature of the problem is exemplified.

By contrast, the number of threaded connections (using the same definition) has been reduced by about two-thirds. This contrast is set forth readily on comparison of FIG. 2 with FIG. 1.

The large number of hand constructed male and female threaded joints is quite expensive to assemble, and yields a completed structure which is subject to twisting or warpage during assembly. Twisting may very readily occur on tightening of the many threaded joints. If nothing else, it is tedious to assemble that many threaded connections. It is tedious, requiring relatively good access to the work area so that craftsmen can get both hands on the parts as they are assembled, and then eventually tighten the threaded connections by use of a pair of adjustable wrenches. Without regard to the hand tools or the procedure used, it is sufficient to note that the structure shown in FIG. 1 and representative of the prior art is very tedious to assemble, typically costing far more in labor than the parts involved in the connective arrangement shown thereat.

It is even more difficult to service the structure shown in FIG. 1. Typically, accumulations of paraffin or hydrates will accumulate in the system, which create difficulties in operation of the pressure measuring instrument, to thereby handicap operation. Accumulated plugs (or wall solids) of paraffin can be removed by rodding the tubes. Rodding refers to the procedure in which a long thin rod is forced through the tubing and any accumulations of paraffin solids are broken and flushed from the tubing. The present apparatus provides a structure which is readily rodded; the structure shown in FIG. 1 is not normally rodded. In fact, rodding is initiated quite easily by unthreading a joint in the unitized connector of this disclosure, and the tubing and connector as thereafter reassembled. The possibilities of warpage and other damage are held to a minimum. This is enhanced by the fairly large gauge structural member disclosed herein, and the relative ease by which access in obtained to the passages through the unitized connector apparatus.

With the problems described hereinabove in mind, the present apparatus is summarized as a unitized connector apparatus for incorporation between measurement instrumentation and a pipeline differential pressure producing element for obtaining flow data. It is particularly suitable for connection therebetween for the purpose of conveying pressure through two separate lines, the pressure variables being communicated with a measuring instrument such as an instantaneous pressure differential meter or the like. This apparatus is, therefore, partially described as an elongate rectangular body having an axial passage drilled therethrough. The axial passage is intersected at both ends of the body by means of transverse lateral passages, and a central lateral passage is also included, all for the purpose of connecting the unified connector in a plumbed system for instrumentation.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiment thereof which is illustrated in the appended drawings, which drawings form a part of this specification. It is to be noted, however, that the appended drawings illustrate only a typical embodiment of the invention and are not to be considered limiting of its scope, for the invention may admit to other equally effective embodiments.

FIG. 1 is a prior art connective apparatus between a pipeline having an orifice plate therein for transfer of differential pressure across the orifice plate to a measuring instrument, and depicts the construction of a system built up from a number of small pieces including crossovers, tees, straight pipe sections and the like;

FIG. 3 is a sectional view taken along the line 3—3 of FIG. 2 showing internal details of construction of the unitized connector apparatus of this disclosure; and FIG. 4 is a view along the line 4—4 of FIG. 3—3, partly in section, showing details of construction of the disclosed apparatus.

DETAILED DESCRIPTION OF THE EXEMPLARY APPARATUS OF THE PRIOR ART

Figure 1:
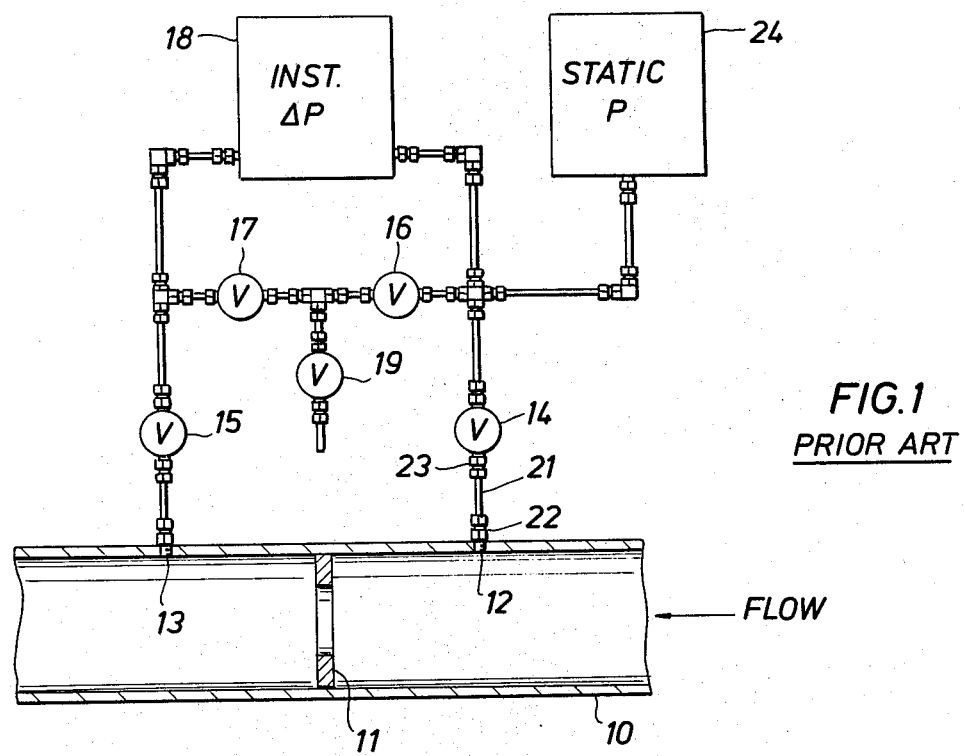

Attention is first directed to FIG. 1 of the drawings for a description of the prior art structure. In FIG. 1 of the drawings, a pipeline 10 flowing a fluid of some value is shown. The fluid has value and is therefore sold upon measurement in standardized units, typically being gallons at a specified temperature, in the case of liquid, or cubic feet in the case of natural gas. The pipeline 10 incorporates an orifice 11. The right hand side will be presumed to be the upstream side, and there is, therefore, a pressure drop formed across the orifice 11. The drop across the orifice is measured and this requires two input variables. To this end, the pipeline 10 is tapped at 12 and 13, one being upstream and the other being downstream. The two taps provide two variables which are subjected to obtain the instantaneous differential pressure. One of the two lines is typically connected to a static pressure instrument. This provides another variable to be used in the calculation of flow.

In FIG. 1, the apparatus is deployed with several valves. The two taps 12 and 13 connect to lines which include valves 14 and 15. They are switched on or off to deliver the two pressure variables to the apparatus. Ordinarily, they are left in the full open position. The system includes additional valves 16 and 17 which are serially connected across the orifice plate. If the valves 16 and 17 are both open, their flow path short circuits the measuring instrument and the measurement value is zero. Ordinarily, the measuring instrument 18 provides the instantaneous differential pressure. The valves 16 and 17 connect serially, and the point between the two of them is vented to atmosphere through another valve 19 which is normally open. The five valve arrangement shown in FIG. 1 is preserved in the arrangement of FIG. 2 as will be described.

The high pressure tap includes the following apparatus. First of all, a short straight pipe section 21 is joined to the pipeline 10 by means of a suitable fitting 22. The opposite end is connected to the valve 14 by a suitable fitting 23. All of the fittings, tees, crossovers and the like can be described. It serves no good purpose to catalog all of these parts other than to simply point out that FIG. 1 incorporates the five valves described heretofore for the purpose of providing two different pressures from the pipeline 10 to the instantaneous differential pressure measuring instrument 18 and the static pressure instrument 24. There are approximately thirty threaded connections as the apparatus is deployed. A concise catalog of the various threaded joints serves no great purpose other than to point out the laborious nature of the constructed system in FIG. 1.

FIG. 1, therefore, discloses the prior art mode of construction and the difficulties that exist with it. One possible difficulty of this structure is a chance of leakage at each connection. The construction of FIG. 1 is particularly labor intensive. There may be at least thirty threaded connections, and each must be made up by hand. This involves threading the parts together; it also involves preparation of the threaded joints, as for instance, doping the joints or otherwise protecting them against leakage. A contrast should be drawn between the prior art construction of FIG. 1 and the advantages which are offered by the unitized connector apparatus set forth in FIG. 2. This drawing depicts a pipeline 30 where the flow is from right to left. It includes an internal orifice 31. A tapped opening 32 is on the upstream side of the orifice, and a similar tapped opening 33 is on the downstream side. Every component in the assembly of FIG. 2 will be described so that the aggregate number of threaded connections can be counted, and the number of threaded connections compared with the threaded connections shown at FIG. 1. Of course, it will be appreciated that FIG. 1 typifies the apparatus in the field today, so typical that probably 100 thousand or more installations of this nature exist at the time of this disclosure. Whatever the case, FIG. 2 details will make clear the advantage of the present disclosure.

Figure 2:
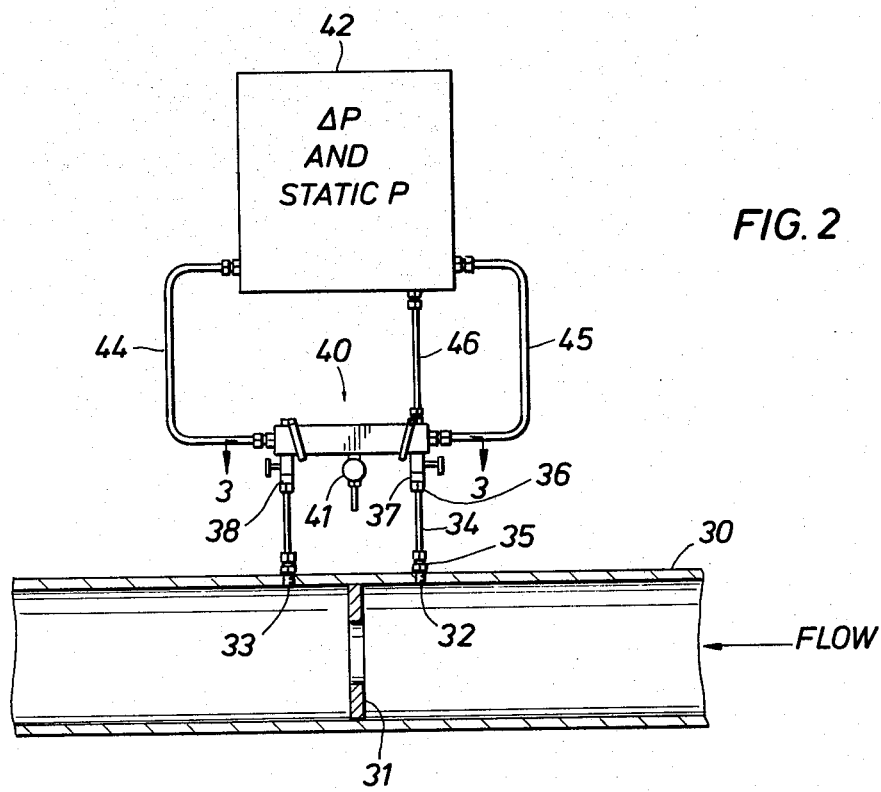
FIG. 2 shows the unitized connector apparatus of the present disclosure and is to be contrasted with the arrangement of FIG. 1 depicting the prior art, thereby setting forth simplification in the connective apparatus; the pipe having the same or a different scale.

The right side of the apparatus in FIG. 2 utilizes a tubing 34 which is joined to the pipe 30 by means of a suitable fitting 35. The pipe terminates at a suitable fitting 36 on a valve 37. The tubing 34 is manufactured straight. It is sometimes bent in handling. Sometimes, it is bent intentionally to align the various parts and components and perhaps avoid the need for an elbow.

It is shaped as desired, departing from the drawings in this way. The valve is typically a plug valve which opens and closes by means of a rising stem and such a valve is sold by the Anderson Greenwood Company as Model No. H1-22. In like fashion, the left hand side includes similar tubing and a valve 38. The valves 36 and 38 correspond to the valves 14 and 15 shown in FIG. 1. They perform the same function, namely isolation of the instrument system from the pipeline.

The numeral 40 identifies the unitized connector apparatus of this disclosure. It has a center tapped opening and receives a valve 41 thereat. This valve is also furnished by the Anderson Greenwood firm and is Model No. H1-2. The models which are listed are not the only models which are acceptable; they reference suitable valves which provide leakproof connection and which have full open and full closed positions.

The numeral 42 identifies an instrument housing. It includes both the instantaneous differential pressure and static pressure sensors, typically connected to a recording chart for obtaining and storing the data of interest. To this end, the unitized connector apparatus 40 connects to a first tubing 44 and a second tubing 45 to provide the two variables to the instantaneous differential pressure sensor. The tubes 44 and 45 are connected to the ends of the unitized connector apparatus. Another connection is provided through a conduit 46. This is furnished for the static pressure measurement. It is assumed that the pressure in the conduit 46 is identical to the pressure in the conduit 45. Obviously, an alternate way of making this connection is to utilize a single tubing and provide a tee at the end of the tubing so that the common pressure signal can be furnished for both measurements. This deployment of two output conduits in FIG. 2 illustrates the versatility of the unitized connector apparatus.

As a general premise, the arrangement of FIG. 2 is markedly efficient of hand labor. It has approximately one-third the number of threaded connections. In part, the precise number of threaded connections to be made depends on whether or not the fittings necessary for the threaded connections are integrally supported on the various valves shown in FIG. 1 and FIG. 2. The same might be said regarding the instrument connections. Whatever the case, the number of threaded connections is reduced in a notable fashion. As a consequence, the system accomplished through the use of the unitized connector apparatus is much less expensive to install, more readily serviceable and more durable.

In FIG. 3 of the drawings, the apparatus is shown in detail. Briefly, it incorporates an elongate rectangular body 50. The body is drilled with a passage 51 from end to end. At the right hand end, it terminates at a tapped opening 52. The left hand end includes a tapped opening 53. The passage 51 is included to provide the flow path which is otherwise provided in FIG. 1 through the valves 16 and 17. FIG. 3 discloses a pair of valves arranged in similar fashion to the valves 16 and 17. The body 50 is preferably formed of bar stock and is about ten to twelve inches in length. While it could be longer, no particular gain is obtained by increasing the length. It is possible to make it shorter, but it cannot be significantly shortened because it then places the components so close that valve manipulation is difficult. The passage 51 is intersected by central lateral passage 54. It terminates at a tapped opening 55 shown in FIG. 4. The tapped opening 55 enables easy threaded connection to the valve 41. The valve 41 is a vent to atmosphere and is included to enable the valve 41 to be attached to the unitized connector apparatus. This vents to atmosphere in the fashion of the valve 19 shown in FIG. 1.

Attention is directed to the left end of FIG. 4 which illustrates additional ports 57 and 59. The ports 57 and 59 are aligned opposite of one another on opposite faces of the bar stock. They are located very near the end. The ports 53, 57 and 59 are all tapped openings, typically constructed with the same diameter and the same thread pitch. This enables the use of a common set of fittings. This is duplicated at the right hand end. This, therefore, enables easy cleaning of the means 40. The means 40 is easily roddable which signifies that a cleaning rod can be easily inserted through the port 53 and reciprocated in the drilled passage 51 to clear caked paraffin and the like. In like fashion, a rod can be inserted through the ports 57 and 59. Cleaning, in this fashion, is easily achieved with the apparatus. Should an accumulation of paraffin collect, access to the port 53 is obtained by unthreading the fitting which is connected to it and inserting the rod to clear the passage 51.

Returning now to FIG. 3 of the drawings, a valve seat of tapered construction is placed in a suitably profiled drilled hole intersecting the passage 51. The valve seat member 60 is externally tapered to fit within a matching drilled hole. This valve seat member 60 is a soft seat means for sealing against the plug. It is drilled along a diameter line to enable it to align with the passage 51. A tapered plug 61 is shown in the valve seat and plugs against flow. The plug is pulled from the seat. The plug is a portion of a valve assembly described as a rising stem valve. A handle 62 is rotated to advance or retract the stem through a tubular fitting 63. The tubular fitting 63 is joined to the body 50 by means of a nut 64, and a threaded valve body 65 is received in the body portion 50.

Briefly, the valves incorporated at both ends of the means 40 are preferably identical. They preferably are constructed with a tapered plug body which is forced into the seat. The tapered plug element 61 is rotated as the stem is rotated, and moves into the seat area plug passage 51.

The duplicate valves thus plug the opposite ends of the passage 51. The duplicate valves are operated in the same fashion. The duplicate valves correspond to the valves 16 and 17 shown in the prior art construction of FIG. 1. Moreover, the duplicate valve arrangement is supported within the valve body 50 as opposed to being individually fabricated and then pieced together in the field with tubing therebetween. In other words, the assembly shown in FIG. 3 is a unitary assembly. The means 40 is a single assembly which is made available for installation of the connective tubing necessary to provide pressure differential signals to appropriate instrumentation.

The unitized connector apparatus 40 is used in the following manner. At the time of installing the tubing necessary to convey pressure signals to suitable instrumentation, the means 40 is first acquired and the following connections are then made to it. The valve 41 is preferably attached at the tapped opening 55. In addition, the valves 36 and 38 are threaded directly to the valve body 50. They are placed in the tapped openings at the ends, typically in the openings 59. In like fashion, the straight conduits to connect with the pipeline are attached to the valves 36 and 38, and the assembly is then joined to the pipeline. Installation is completed by attaching the lines 44, 45 and 46. This provides the operator with the requisite five valve control system which is necessary in the installation, operation and maintenance of the instrumentation. In fact, the installation of the system shown in FIG. 2 can be completed in very rapid order in contrast with that required for the prior art.

As will be appreciated, the shortcuts available to the prior art are somewhat limited by the working pressure. If the working pressure is quite high, extra precautions must be undertaken to prevent leakage. This, for instance, eliminates the possible use of plastic or rubber-like material in the tubing and may require high pressure fittings, thread sealants and the like, all with a view of providing the proper accessories dependent on the working pressure. In the event the fluid to be measured includes hydrogen sulfide, other precautions must be taken to limit metal embrittlement as a result of exposure to corrosive gases of this nature.

While the foregoing is directed to the preferred embodiment, the scope is determined by the claims which follow.

We claim:

1. For use with a pipeline flowing a fluid therethrough and wherein a pressure differential in the pipeline is created across a differential pressure producing restriction within the pipeline, unitized connector apparatus for connecting measuring instrumentation with the pipeline, the connector apparatus comprising an elongate unitized body having two remote ends and a lengthwise passage between the two ends, said body also being adapted to thread and support serially with said passage first and second spaced valve assemblies for selectively opening and closing for selective valving action of fluid flow along said passage, and wherein said passage terminates at multiple tapped openings on said body at each end to enable connections to be made with said body on installation between openings in a pipeline and the measuring instrumentation for providing two fluid pressure signals from the pipeline through said apparatus to the measuring instrumentation connected thereto, and said body is elongate bar stock having a cross-section and said passage is axially positioned along the length thereof;

said bar stock has a pair of opposing parallel side faces perforated with two of said multiple tapped openings formed as opposing tapped openings and the two tapped openings are aligned on opposite faces of said body and are connected directly therethrough to enable rodding through one of said tapped openings and out the opposing opening for cleaning purposes;

wherein said body is roddable through said lengthwise passage from one end thereof; and one of said multiple tapped openings is aligned with said passage to enable a rod to be inserted through said passage at said tapped opening through the full length of said body and out the corresponding multiple tapped opening on the opposite end thereof.

2. The apparatus of claim 1 including an intermediate lateral passage intersecting said passage and wherein said intermediate passage terminates at a tapped opening to the exterior at a central portion of said elongate body and is adapted to receive in threaded connection therewith a valve assembly, wherein said valve assembly, in conjunction with said pair of valve assemblies provides a connection across the measuring instrumentation.

* * * * *